(12) United States Patent
Farrell

(10) Patent No.: US 7,434,948 B2
(45) Date of Patent: Oct. 14, 2008

(54) OPTICAL ARCHITECTURE REQUIRING A SINGLE TILT MIRROR TO PASS A COLLIMATED BEAM THROUGH AN APERTURE STOP, CENTERED, AT A DESIRED ANGLE, IN ONE OR TWO DIMENSIONS

(75) Inventor: Thomas Charles Farrell, Redondo Beach, CA (US)

(73) Assignee: Northrop Grumman Space & Missions Systems Corp., Los Angeles, CA (US)

( * ) Notice: Subject to any disclaimer, the term of this patent is extended or adjusted under 35 U.S.C. 154(b) by 14 days.

(21) Appl. No.: 11/590,299

(22) Filed: Oct. 31, 2006

(65) Prior Publication Data

US 2008/0100937 A1     May 1, 2008

(51) Int. Cl.
*G02B 5/08* (2006.01)
(52) U.S. Cl. ...................................... 359/850
(58) Field of Classification Search ................ 359/850, 359/857, 856, 872
See application file for complete search history.

(56) References Cited

U.S. PATENT DOCUMENTS 6,061,033 A * 5/2000 Hulderman et al. ... 343/781 CA

* cited by examiner

*Primary Examiner*—Euncha P Cherry
(74) *Attorney, Agent, or Firm*—John A. Miller; Miller IP Group, PLC

(57) ABSTRACT

An optical architecture for a high-energy laser that directs a collimated laser beam through an aperture stop at a desired angle. In one embodiment, the optical architecture includes a single tilt mirror and three stationary mirrors that direct the laser beam in one dimension. The laser beam is reflected off of the mirrors in the same plane and is reflected off of the tilt mirror three times. The first two reflections off of the tilt mirror translate the beam and the third reflection causes the beam to be directed at the desired angle. In another embodiment, the optical architecture includes a single tip-tilt mirror and eight stationary mirrors that direct the beam in two dimensions. The laser beam is reflected off of the mirrors in two planes and is reflected off of the tip-tilt mirror three times. The first two reflections off of the tip-tilt mirror translate the beam and the third reflection causes the beam to be directed at the desired angle.

20 Claims, 4 Drawing Sheets

OPTICAL ARCHITECTURE REQUIRING A SINGLE TILT MIRROR TO PASS A COLLIMATED BEAM THROUGH AN APERTURE STOP, CENTERED, AT A DESIRED ANGLE, IN ONE OR TWO DIMENSIONS

BACKGROUND OF THE INVENTION

1. Field of the Invention

This invention relates generally to an optical architecture for directing a laser beam and, more particularly, to an optical architecture for directing a collimated high-energy laser beam through an aperture stop at a desired angle in one or two dimensions using a single tilt mirror.

2. Discussion of the Related Art

High-energy lasers (HEL) have various applications in the art, such as target range finding and destruction. FIG. 1 is a general plan view of a laser system 10 including a high-energy laser 12 that emits a collimated laser beam. The laser beam is received by an optical architecture 14 that provides beam conditioning and directivity to cause the beam to be emitted through an aperture stop 18 having an aperture 20 at a desired angle towards a target (not shown). Because the beam is high energy, it is typically undesirable to re-image the beam, i.e., bring it to a focus, within the optical architecture 14 because the focused beam causes air to break down, and other adverse effects, which prevents the optical architecture 14 from operating properly in a manner that is well understood in the art.

One solution to this problem is to provide a vacuum chamber in the optical architecture 14 at the location where the beam needs to be focused so that the beam does not interact with air. However, such vacuum chambers for this application are typically large, heavy, complex and costly.

Another solution to this problem is to maintain the laser beam collimated as it propagates through the optical architecture 14. Current optical architectures for providing beam direction control that maintain the beam collimated employ two tilt mirrors. Essentially, one of the tilt mirrors applies the desired beam angle, but translates the beam, and the other tilt mirror directs the tilted and translated beam to the center of the aperture 20. However, the algorithms required to tilt two mirrors accurately and properly in concert with each other are difficult to implement and are typically unreliable. It would be desirable to simplify the optical architecture 14 by eliminating one of the tilt mirrors to reduce the complexity, size, weight, cost and power consumption of the optical architecture 14.

SUMMARY OF THE INVENTION

In accordance with the teachings of the present invention, an optical architecture is disclosed for a high-energy laser system that directs a collimated laser beam through an aperture stop at a desired angle. In one embodiment, the optical architecture includes a single tilt mirror and three stationary mirrors that direct the laser beam in one dimension. The laser beam is reflected off of the mirrors in the same plane and is reflected off of the tilt mirror three times. The first two reflections off of the tilt mirror translate the beam and the third reflection causes the beam to be directed at the desired angle. In another embodiment, the optical architecture includes a single tip-tilt mirror and eight stationary mirrors that direct the beam in two dimensions. The laser beam is reflected off of the mirrors in two planes and is reflected off of the tip-tilt mirror three times. The first two reflections off of the tip-tilt mirror translate the beam and the third reflection causes the beam to be directed at the desired angle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an optical architecture for directing a collimated optical beam through an aperture stop at a desired angle is merely exemplary in nature, and is in no way intended to limit the invention or its applications or uses. For example, the optical architecture of the invention has particular application for directing a high-energy laser beam. However, as will be appreciated by those skilled in the art, the optical architecture of the invention may have other applications for other optical systems.

The present invention proposes an optical architecture suitable for the optical architecture 14 that employs a single tilt mirror, and can direct a collimated laser beam in one or two dimensions. As will be discussed in detail below, the optical architecture of the invention maintains the laser beam collimation and directs the beam through the aperture 20 with a desired beam angle.

Figure 1:
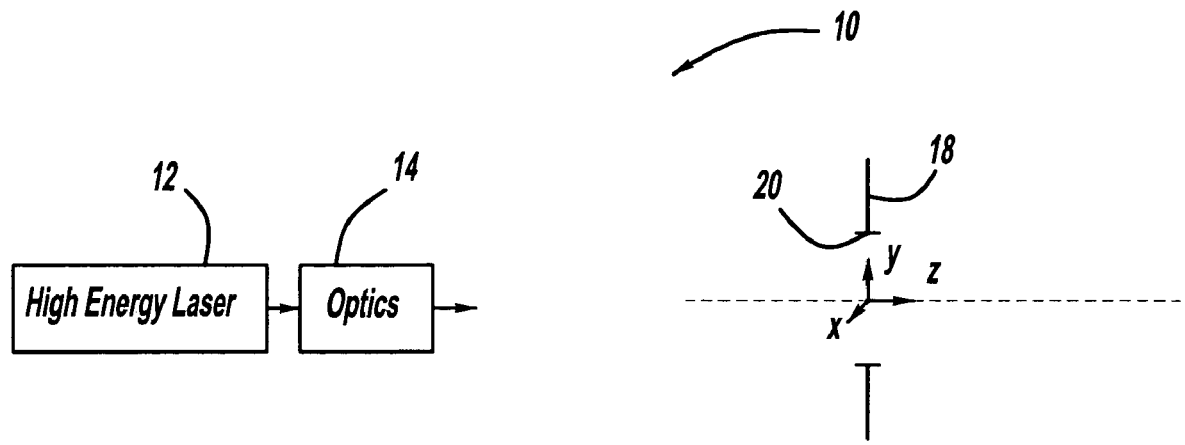
FIG. 1 is a plan view of a laser system employing a high-energy laser and an optical architecture for directing and centering a laser beam through an aperture stop.
Figure 2:
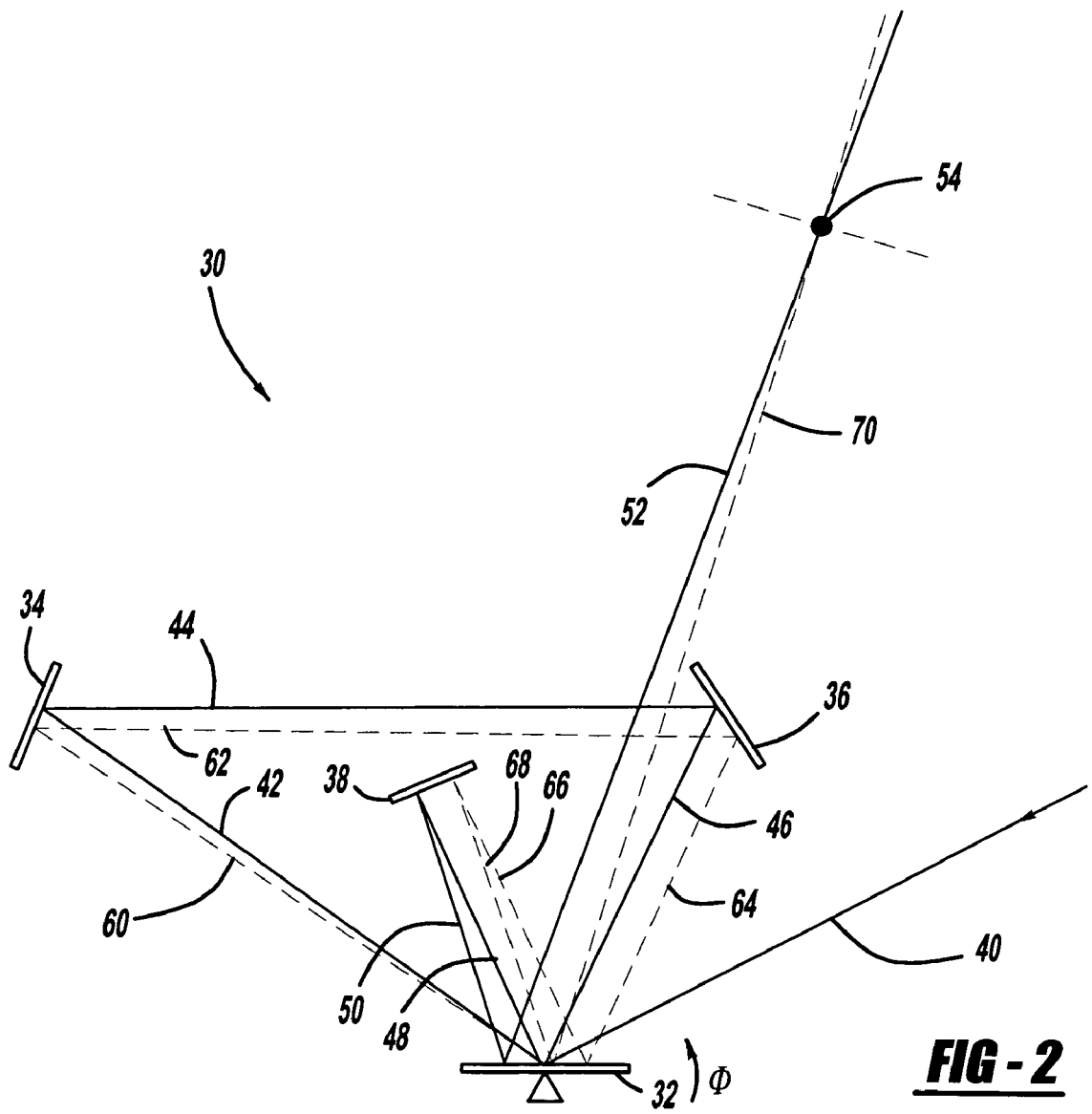
FIG. 2 is an optical architecture suitable for the optical architecture shown in FIG. 1 employing a single tilt mirror for providing a desired beam angle in one dimension, according to an embodiment of the present invention.

FIG. 2 is a plan view of an optical architecture 30 that directs the beam in one dimension, according to one embodiment of the present invention. The optical architecture 30 includes a single tilt mirror 32 and three stationary flat mirrors 34, 36 and 38 generally configured as shown. The laser beam from the laser 12 enters the optical architecture 30 as beam 40 towards the center of the tilt mirror 32. If the tilt mirror 32 does not have a tilt angle φ, then the beam 40 is reflected off of the tilt mirror 32 as nominal beam 42, the nominal beam 42 is then reflected off of the mirror 34 as nominal beam 44, the nominal beam 44 is then reflected off of the mirror 36 as nominal beam 46, and the nominal beam 46 is then reflected again off of the tilt mirror 32 as nominal beam 48 at the center of the tilt mirror 32. The nominal beam 48 is reflected off of the mirror 38 as nominal beam 50, and the nominal beam 50 is then reflected off of the tilt mirror 32 as output beam 52 that is directed through a spot 54, representing the center of the aperture 20. The mirror 38 is tilted so that the reflection of the beam 50 off of the tilt mirror 32 does not cause the beam 52 to impinge the mirrors 34 and 36.

If the tilt mirror 32 is tilted towards the left at a tilt angle ϕ, the beam 40 is reflected off the tilt mirror 32 as beam 60, the beam 60 is then reflected off of the mirror 34 as beam 62, the beam 62 is then reflected off the mirror 36 as beam 64, and the beam 64 is then reflected off of the tilt mirror 32 as beam 66. When the tilt mirror 32 is tilted, the second reflection off of the tilt mirror 32 will always be on the uphill side of the mirror 32 when the stationary mirrors 34 and 36 are in this configuration. The first reflection off of the tilt mirror 32 adds an angle to the beam 40 of 2ϕ, and the second reflection of the beam off of the tilt mirror 32 removes the angle, but provides a translation to the beam 66 relative to the nominal beam 48. In this manner, the beams 48 and 66 will always be parallel to each other, but will have a slight translation that is dependent upon the amount of tilt of the tilt mirror 32. The beam 66 is then reflected off of the mirror 38 as beam 68, and the beam 68 is reflected off of the tilt mirror 32 as output beam 70. Because the tilt mirror 32 is tilted, a tilt angle is imparted to the beam 70, which causes it to also be directed through the spot 54. Thus, the optical architecture 30 uses a single tilt mirror to both translate and direct the beam at the desired angle.

The mirror 38 should be centered in the same plane as the mirrors 34 and 36, but it is not important whether the mirror 38 is above or below the mirrors 34 and 36. The mirror 38 should be adjusted so that the nominal beam 50 hits the tilt mirror 32 on the third reflection at some point offset from the point where the nominal beam 46 hits the tilt mirror 32 on the second reflection so as to prevent the beam from simply retro-reflecting back, where it could hit the mirror 36.

The mirror 38 reflects the beam 66 back to the tilt mirror 32, where a tilt of 2ϕ with respect to the nominal beam 52 is applied to the output beam 70. The net result of this translation u' in a direction normal to the nominal beam 50, and the application of the tilt, causes the output beam 70 to cross the nominal beam path at the spot 54, referred to as the "pivot point," at a distance r from the tilt mirror 32 that provides the desired angle for the output beam 70.

It is necessary that the mirrors 32, 34, 36 and 38 be in the same plane. However, the alignment of the mirrors 32, 34, 36 and 38 is not particularly critical. The angle of the stationary mirrors 34, 36 and 38 has to be such that they direct the beam in the proper direction, as discussed above. The size of the mirrors 32, 34, 36 and 38 is application specification, and typically depends on the diameter of the beam being reflected. The tilt mirror 32 needs to be a certain percentage larger than the diameter of the beam to accommodate the translation.

Figure 3:
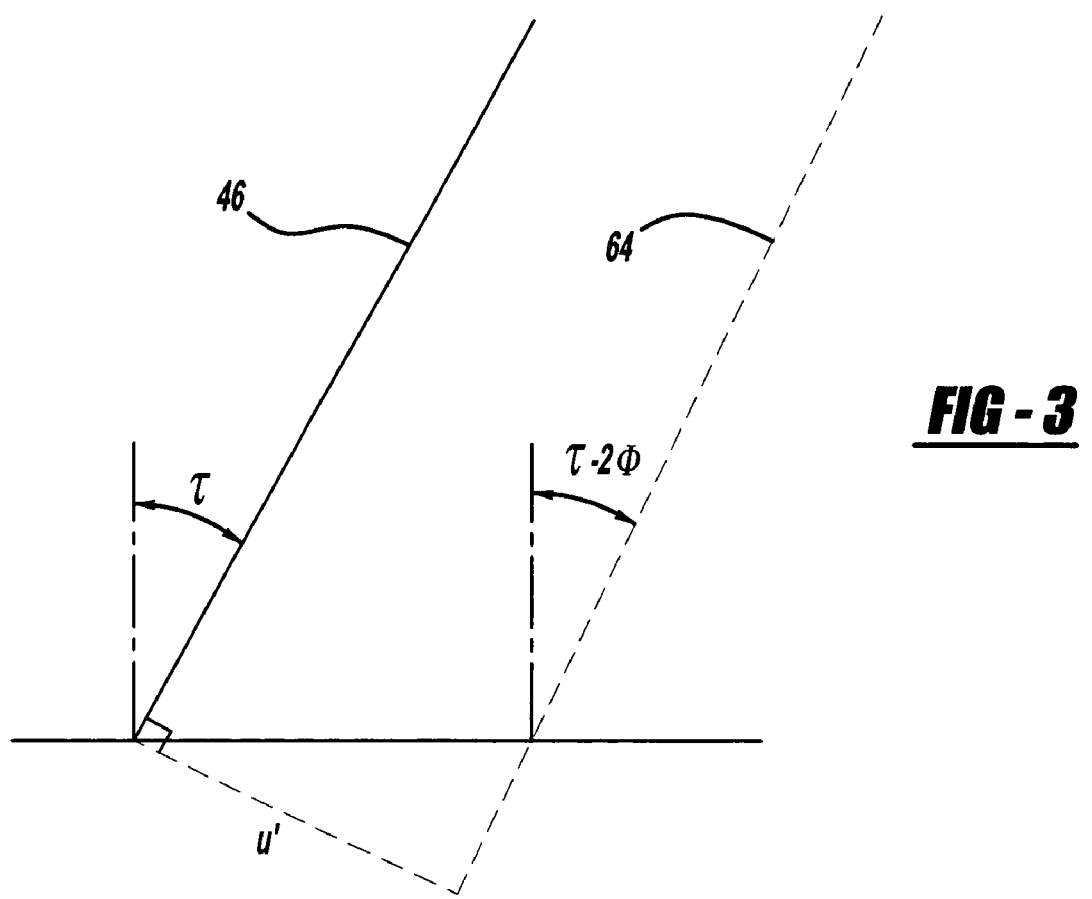
FIG. 3 is an optical diagram of the beams being reflected on to the tilt mirror shown in FIG. 2 the second time.

The operation of the optical architecture 30 can be shown mathematically. FIG. 3 is an optical diagram showing the details of the beams 46 and 64 entering the tilt mirror 32 just before the second reflection off of the tilt mirror 32. Let $s_1$ be the distance between the tilt mirror 32 and the mirror 34, $s_2$ be the distance between the mirror 34 and the mirror 36 and $s_3$ be the distance between the mirror 36 and the tilt mirror 32 along the nominal beam path. The centers of the mirrors 32-36 are all located on a plane parallel to the page. By tilting the tilt mirror 32, the net result is that the beam will translate in the "uphill" direction for its second reflection off of the tilt mirror 32. This translation is given approximately as:

$$u' \approx (s_1 + s_2 + s_3) \cdot \tan(2\phi) \tag{1}$$

The translation distance is normal to the direction of the nominal beam 46, where τ is the angle that the nominal beam 46 hits the tilt mirror 32, with respect to normal, on the second reflection. Because of the tilt of the tilt mirror 32, however, after the second reflection, the beam 66 leaves the tilt mirror 32 at an angle τ−2ϕ+2ϕ=τ, or parallel to the path of the nominal beam 48.

Figure 4:
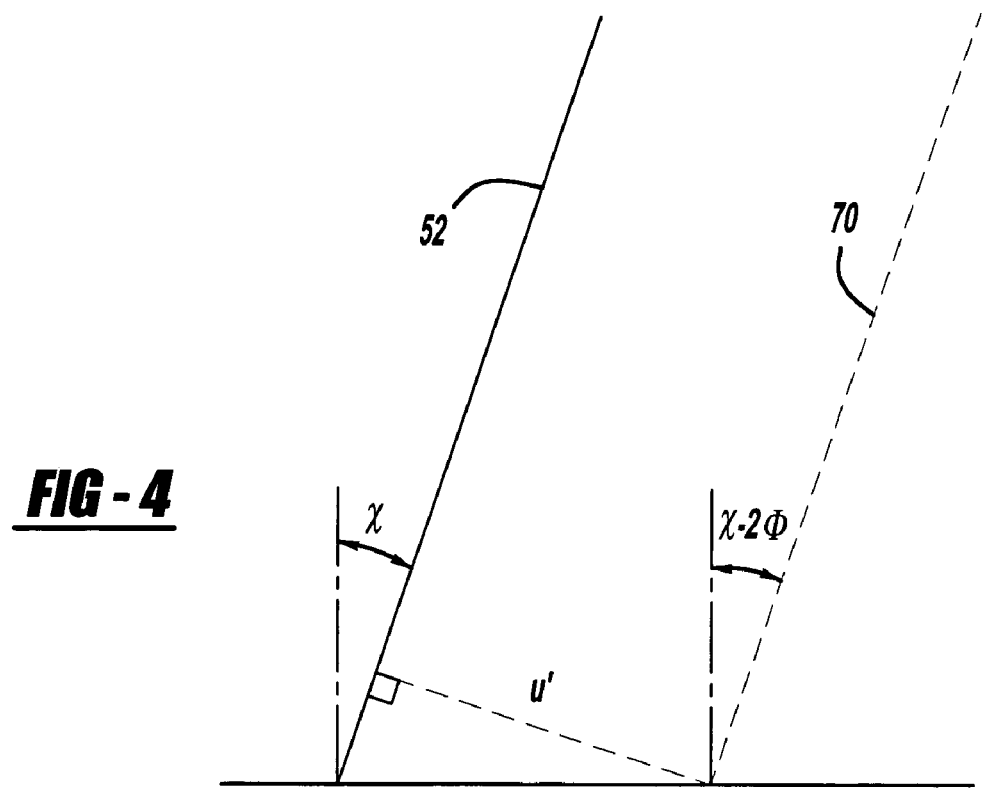
FIG. 4 is an optical diagram of the beams being reflected off of the tilt mirror shown in FIG. 2 the third time.

FIG. 4 is an optical diagram showing the details of the third reflection of the beams 52 and 70 off of the tilt mirror 32. The angle χ is the angle that the nominal beam 52 makes with the nominal normal to the tilt mirror 32, and the distance u' is the distance of the tilted output beam 70 from the nominal beam 52 at the tilt mirror 32. The 2ϕ tilt of the tilt mirror 32 results in the optical beam 70 tilting 2ϕ with respect to the nominal output beam 52. The combination of the translation u' and tilt 2ϕ results in the output beam 70 crossing the path of the nominal output beam 52 at the pivot point, spot 54, at a distance:

$$r = \frac{u'}{\tan(2\phi)} - (s_1 + s_2 + s_3) \cdot \tan(2\phi) \cdot \tan(\chi) \tag{2}$$

Combining equation (2) with equation (1) gives:

$$r \approx (s_1 + s_2 + s_3) - (s_1 + s_2 + s_3) \cdot \tan(2\phi) \cdot \tan(\chi) \tag{3}$$

As long as the tilt angle ϕ is small, or as long as the angle χ is small, the second term can be dropped because it is insignificantly small, providing:

$$r \approx (s_1 + s_2 + s_3) \tag{4}$$

In other words, the distance r of the pivot point at the spot 54 from the tilt mirror 32 is approximately equal to the distance of the "loop" between the first and second reflections off of the tilt mirror 32. The spot 54 hardly moves as the tilt angle ϕ changes.

In certain applications, it may be desirable to steer the beam in a second plane perpendicular to the first plane. One way to do this is to use two of the optical architectures 30, with the first one having a relatively large loop and the second one perpendicular to the first and located, with a relatively small loop between the first tilt mirror and the pivot point. The two architectures may be set up to have a common pivot point. This cascade requires two separate tilt mirrors, each tilting in one plane only, so that together they cover the angular directions.

Figure 5:
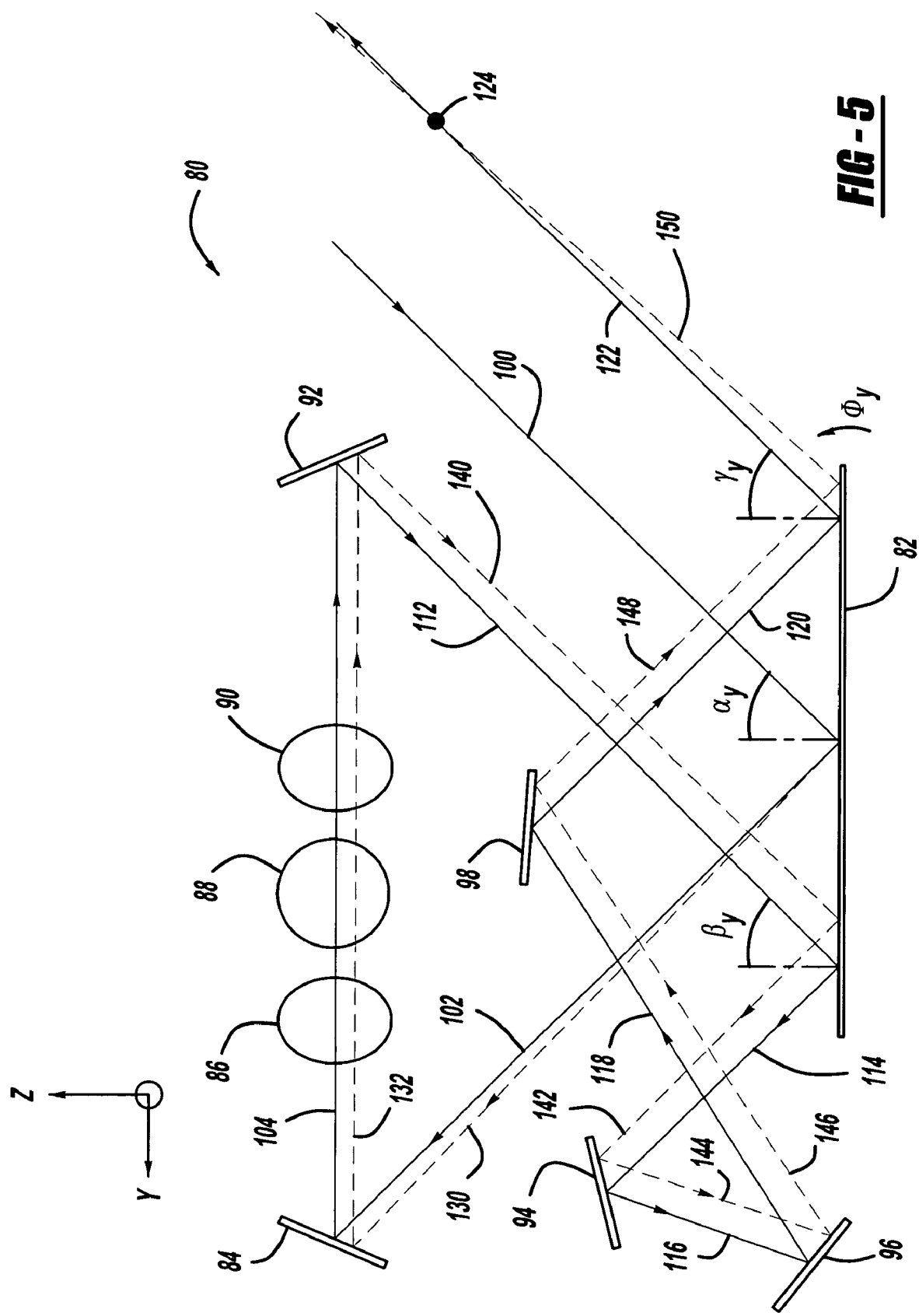
FIG. 5 is a plan view of an optical architecture suitable for the optical architecture shown in FIG. 1 employing a single tilt mirror for providing a desired beam angle in two dimensions, according to another embodiment of the present invention.
Figure 6:
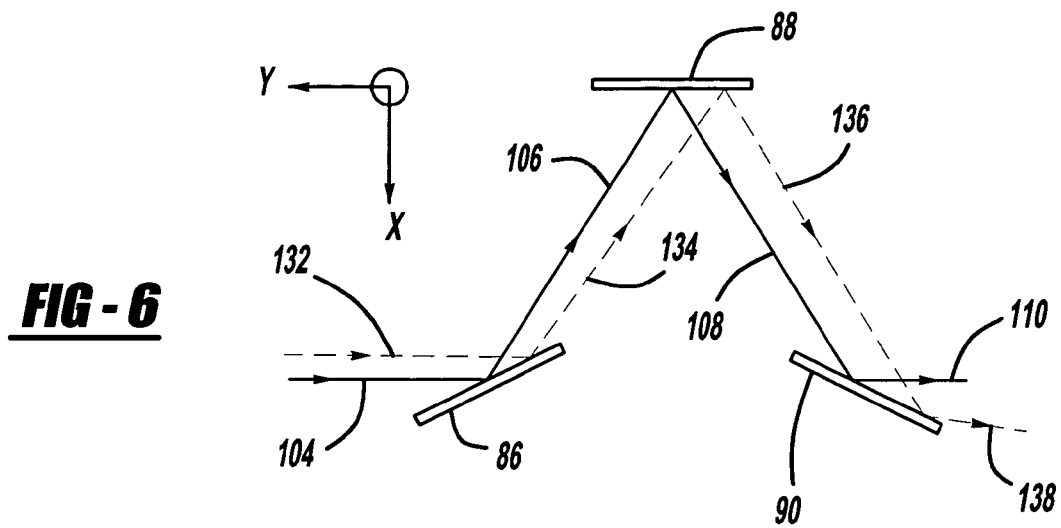
FIG. 6 is a plan view of a portion of the optical architecture shown in FIG. 5.

For other applications, it may be desirable to provide beam angle control in two dimensions, but still using a single tilt mirror. FIG. 5 is a plan view of an optical architecture 80 including a single tip-tilt mirror 82 and eight stationary flat mirrors 84, 86, 88, 90, 92, 94, 96 and 98, according to another embodiment of the present invention, that also has application for the optical architecture 14. The tip-tilt mirror 82 is able to tilt in both the y-direction as angle $\phi_y$ and the x-direction as angle $\phi_x$. The reflection of the beams off of the mirrors 82, 84, 92, 94, 96 and 98 can be shown in the plane of the paper. However, the reflection of the beams off of the mirrors 86, 88 and 90 are in a direction outside of the plane of the paper, where the combination of the mirror 86, 88 and 90 would either be above or below the paper. In order to illustrate this, FIG. 6 shows the mirrors 86, 88 and 90 in a different plane, where the z-axis is coming out of the page.

The laser beam enters the optical architecture 80 as beam 100 and is reflected off of a center location of the tip-tilt mirror 82 at an angle $\alpha_y$ relative to normal. If the mirror 82 is not tilted, the beam 100 is reflected off of the tilt mirror 82 as nominal beam 102, and the nominal beam 102 is then reflected off of the mirror 84 as nominal beam 104. The nominal beam 104 is then reflected off of the mirror 86 as nominal beam 106, and the nominal beam 106 is then reflected off of the mirror 88 as nominal beam 108. The nominal beam 108 is then reflected off of the mirror 90 as nominal beam 110, and the nominal beam 110 is then reflected off of the mirror 92 as nominal beam 112. The nominal beam 112 is then reflected off of the tip-tilt mirror 82 at an angle $\beta_y$ relative to normal as nominal beam 114. In this orientation of the mirrors, the nominal beams 100 and 112 will be parallel where the angles $\alpha_y$ and $\beta_y$ are the same. The nominal beam 114 is then reflected off the mirror 94 as nominal beam 116, and the nominal beam 116 is then reflected off the mirror 96 as nominal beam 118. The nominal beam 118 is then reflected off of the mirror 98 as nominal beam 120, and the nominal beam 120 is then reflected off the tip-tilt mirror 82 as nominal output beam 122 that is directed through spot 124 representing the aperture 20. The nominal beam 120 is reflected off of the tip-tilt mirror 82 at an angle $\gamma_y$ relative to normal that is the same as the angles $\alpha_y$ and $\beta_y$.

Because the nominal beams 100, 112 and 122 are parallel to each other, it is necessary that the tip-tilt mirror 52 be at least three times the diameter of the beam so that the beams are separated. Because the centers of the nominal beams reflecting off of the tip-tilt mirror 82 are all in-line along an axis parallel to the y-axis, and the translations due to the tip and tilt are not very large, the tip-tilt mirror 82 along the axis parallel to the x-axis is only required to be slightly larger than the beam diameter.

When the tip-tilt mirror 82 is tilted in the y-direction, the x-direction or both, the incoming beam 100 is reflected off of the tip-tilt mirror 82 as beam 130, the beam 130 is then reflected off of the mirror 84 as beam 132, the beam 132 is then reflected off of the mirror 86 as beam 134, the beam 134 is then reflected off of the mirror 88 as beam 136, the beam 136 is then reflected off the mirror 90 as beam 138, the beam 138 is then reflected off of the mirror 92 as beam 140, and the beam 140 is then reflected off of the tip-tilt mirror 82 as beam 142. The beam 142 will be reflected off of the tip-tilt mirror 82 up-hill from the tilt of the mirror 82 in the same manner as discussed above. The beam 142 is then reflected off of the mirror 94 as beam 144, the beam 144 is then reflected off of the mirror 96 as beam 146, the beam 146 is then reflected off of the mirror 98 as beam 148, and the beam 148 is then reflected off of the tip-tilt mirror 82 as output beam 150 that propagates through the spot 124.

Figure 7:
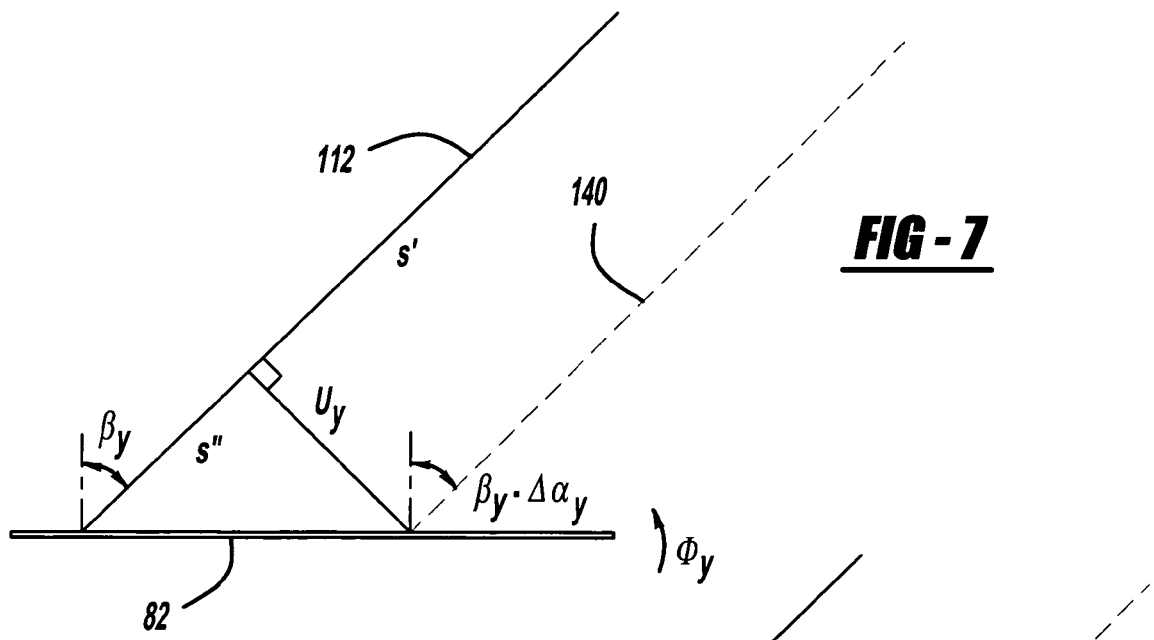
FIG. 7 is an optical diagram of the beams being reflected off of the tilt mirror shown in FIG. 5 a second time.

To further illustrate how the optical architecture 80 operates, consider the tilt of the tip-tilt mirror 82 is in the y-z plane, i.e., $\phi_y \neq 0$, and there is no tilt in the x-z plane, i.e., $\phi_x = 0$. The beam 130 is deviated from the nominal beam 100 by an angle $\Delta\alpha_y = 2\phi_y$. At the second reflection of the beam 140 off of the tip-tilt mirror 82, the beam 140 is translated from the nominal beam 112 by an amount defined as $u_y$ as shown in FIG. 7. To a first order, this can be approximated as:

$$u_y \approx s \cdot \tan(\Delta\alpha_y) \tag{5}$$

Where, $$s \equiv \sum_{i=1}^{6} \text{length of } s_i \tag{6}$$

Where, $s_1$ is the path length of the beam 102, $s_2$ is the path length of the beam 104, $s_3$ is the path length of the beam 106, $s_4$ is the path length of the beam 108, $s_5$ is the path length of the beam 110, $s_6$ is the path length of the beam 112, s" is defined as shown, and s' is approximately equal to s–s", which gives:

$$\frac{u_y}{s'} = \tan(\Delta\alpha_y) \tag{7}$$

$$\frac{s''}{u_y} = \tan(\beta_y) \tag{8}$$

This gives:

$$u_y = s \cdot \frac{\tan(\Delta\alpha_y)}{\tan(\beta_y) + 1} \tag{9}$$

Note that equation (9) approaches the approximation when the angle $\beta_y$ is made as small as possible by the arrangement of the mirrors.

The angle at which the deviated beam 140 falls onto the tip-tilt mirror 82 at the second reflection is $\beta_y - \Delta\alpha_y = \beta_y - 2\phi_y$. The beam 142 from the second reflection off of the tip-tilt mirror 82 has two times the tilt of the mirror 82 applied and is:

$$\Delta\beta_y = \beta_y - 2\phi_y + 2\phi_y = \beta_y \tag{10}$$

Figure 8:
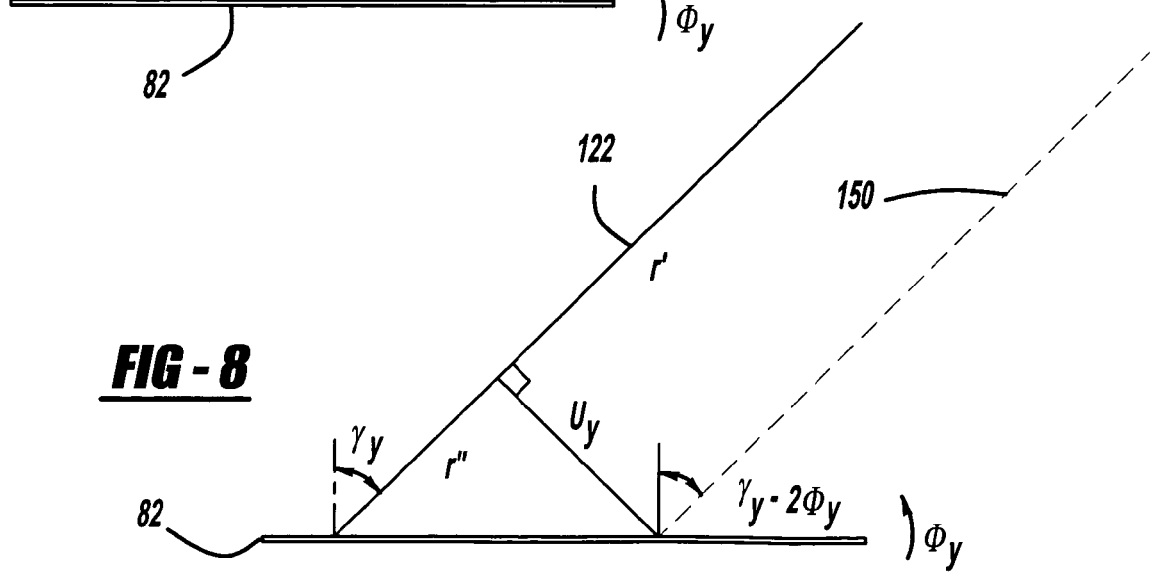
FIG. 8 is an optical diagram of the beams being reflected off of the tilt mirror shown in FIG. 5 a third time.

In other words, the deviated beam 142 is parallel to the nominal beam 114. Because the deviated beam 142 started parallel to the nominal beam 114, it remains parallel over the entire loop encompassing the mirrors 82, 94, 96 and 98. Therefore, as the beam 148 enters the third reflection, it falls onto the tip-tilt mirror 82 at the same angle $\gamma_y$ as the nominal beam 120, and the beam 122 is at the same distance $u_y$ from the nominal beam 150 as the beams 112 and 140 at the second reflection. As the deviated beam 150 leaves the tip-tilt mirror 82 for the third time, as shown in FIG. 8, a tilt of $\Delta\gamma_y = \gamma_y - 2\phi_y$ is applied. The distance $r_y$ from the third reflection of the beam 150 off of the tip-tilt mirror 82 to the pivot point 124 can be approximated as:

$$r_y \approx \frac{u_y}{\tan(2\phi_y)} \tag{11}$$

Combining equation (11) with equation (5) gives:

$$r_y \approx s \tag{12}$$

With more accuracy, $r_y$" is defined as shown in FIG. 8, and $r'_y \equiv r_y - r''_y$. In that case:

$$r'_y = \frac{u_y}{\tan(2\phi_y)} \tag{13}$$

$$r''_y = \frac{u_y}{\tan\left(\frac{\pi}{2} - \gamma_y\right)} \tag{14}$$

This gives:

$$r_y = s \cdot \left[ \frac{\tan(\frac{\pi}{2} - \gamma_y) + \tan(2\phi_y)}{[\tan(\beta_y) + 1] \cdot \tan(\frac{\pi}{2} - \gamma_y)} \right] \quad (15)$$

Note that it is undesirable for the location of the pivot point spot 124 to vary with the tilt of the tip-tilt mirror 82, and, while this is approximately achieved, as indicated by Equation (11), it may not be achieved in practice, as indicated by the dependence on $\phi_y$ shown in equation (15). Nevertheless, it is a small effect and is minimized by making the angle $\gamma_y$ as small as practical.

Now consider the tilt of the tip-tilt mirror 82 in the x-z plane, i.e., $\phi_x \neq 0$ and $\phi_y = 0$. In this case, the beam 130 is deviated from the nominal beam 102 out of the page by:

$$\Delta\alpha_x \equiv \alpha \sin\lfloor \sin(2\phi_x) \cdot \cos(\alpha_y) \rfloor \approx 2\phi_x \cdot \cos(\alpha_y) \quad (16)$$

Where the approximation is valid in the case where the angle $\phi_x$ is small.

At the second reflection of the beam 140 off of the tip-tilt mirror 82, the beam 142 is deviated by:

$$u_x = s \cdot \tan(\Delta\alpha_x) \quad (17)$$

After the second reflection, the beam 142 leaves the tip-tilt mirror 82 with an angle component in the x-direction of:

$$\Delta\beta_x = -\Delta\alpha_x + 2\phi_x \cdot \cos(\beta_y) = 2\phi_x \lfloor \cos(\beta_y) - \cos(\alpha_y) \rfloor \quad (18)$$

Note that if $\alpha_y = \beta_y$, then $\Delta\beta_x = 0$, and the deviated beam 142, leaving from the second reflection off of the tip-tilt mirror 82, is parallel to the nominal beam 114.

At the third reflection of the beam 148 off of the tip-tilt mirror 82, the beam 150 is deviated by a distance from the nominal beam 122 as:

$$w_x = u_x + t \cdot \tan(\Delta\beta_x) \quad (19)$$

Where t is defined as:

$$t \equiv \sum_{i=7}^{10} \text{length of } s_i \quad (20)$$

Where $s_7$ is the path length of the beam 114, $s_8$ is the path length of the beam 116, $s_9$ is the path length of the beam 118 and $s_{10}$ is the path length of the beam 120.

The x component of the angle at which the deviated beam 150 leaves the tip-tilt mirror 82 for the third time is:

$$\Delta\gamma_x = \Delta\beta_x + 2\phi_x \cos(\gamma_y) = 2\phi_x \lfloor -\cos(\alpha_y) + \cos(\beta_y) + \cos(\gamma_y) \rfloor \quad (21)$$

The distance $r_x$ from the third reflection of the beam 150 off of the tip-tilt mirror 82 to the pivot point spot 124 is:

$$r_x = \frac{w_x}{\tan(\Delta\gamma_x)} \quad (22)$$
$$= \frac{s \cdot \tan(2\phi_x \cos(\alpha_y)) + t \cdot \tan(2\phi_x \lfloor -\cos(\alpha_y) + \cos(\beta_y) \rfloor)}{\tan(2\phi_x [-\cos(\alpha_y) + \cos(\beta_y) + \cos(\gamma_y)])}$$

If the angle $\alpha_y = \beta_y$, forcing the second reflection of the deviated beam 142 to be parallel with the nominal beam 114, then equation (22) becomes:

$$r_x = \frac{s \cdot \tan(2\phi_x \cos(\alpha_y))}{\tan(2\phi_x \cos(\gamma_y))} \quad (23)$$

If it is required that the angle $\alpha_y = \gamma_y$, then $r_x = s$.

Because the two planes are orthogonal, the overall tilt may be decomposed into components in the x-z and y-z planes. In that case, each component may be treated by the analyses above. In the two cases, to a sufficient approximation:

$$r_y = r_x = s \quad (24)$$

and the pivot points in each of these two cases is a single point.

Therefore, it has been shown that the optical architecture 80 does steer the collimated beam in angle while passing through a single pivot point, which may be taken to be the center of aperture stop.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical architecture for directing an optical beam, said architecture comprising:
   a tiltable mirror;
   a first stationary mirror;
   a second stationary mirror; and
   a third stationary mirror, wherein the tiltable mirror, the first stationary mirror, the second stationary mirror and the third stationary mirror are configured so that the optical beam is reflected off of the tiltable mirror, the first stationary mirror, the second stationary mirror and the third stationary mirror to provide a predetermined beam direction and a predetermined beam angle based on the tilt of the tiltable mirror, and wherein the optical beam is reflected off of the tiltable mirror three times to provide the predetermined beam direction and angle to the optical beam.

2. The optical architecture according to claim 1 wherein the first and second reflections of the beam off of the tiltable mirror cause the optical beam to be translated and the third reflection of the beam off of the tiltable mirror causes the optical beam to be directed at the predetermined beam angle.

3. The optical architecture according to claim 1 wherein the optical beam first impinges the tiltable mirror, then impinges the first stationary mirror, then impinges the second stationary mirror, then impinges the tiltable mirror, then impinges the third stationary mirror, then impinges the tiltable mirror to provide the desired direction and angle to the optical beam.

4. The optical architecture according to claim 1 wherein the optical beam reflected off of the tiltable mirror the second time, when the tiltable mirror is tilted, is parallel to the optical beam reflected off of the tiltable mirror the second time, when the tiltable mirror is not tilted.

5. The optical architecture according to claim 1 further comprising an aperture, wherein the tiltable mirror, the first stationary mirror, the second stationary mirror and the third stationary mirror direct the beam through the aperture regardless of the tilt of the tiltable mirror.

6. The optical architecture according to claim 1 wherein the tiltable mirror, the first stationary mirror, the second stationary mirror and the third stationary mirror all reflect the optical beam in the substantially same plane.

7. The optical architecture according to claim 1 wherein the optical beam is a high-energy laser beam.

8. An optical architecture for directing a collimated optical beam, said architecture comprising:
- a tiltable mirror;
- a first stationary mirror;
- a second stationary mirror;
- a third stationary mirror;
- a fourth stationary mirror;
- a fifth stationary mirror;
- a sixth stationary mirror;
- a seventh stationary mirror; and
- an eighth stationary mirror, wherein the tiltable mirror, the first stationary mirror, the second stationary mirror, the third stationary mirror, the fourth stationary mirror, the fifth stationary mirror, the sixth stationary mirror, the seventh stationary mirror and the eighth stationary mirror are configured so that the optical beam is reflected off of the tiltable mirror, the first stationary mirror, the second stationary mirror, the third stationary mirror, the fourth stationary mirror, the fifth stationary mirror, the sixth stationary mirror, the seventh stationary mirror and the eighth stationary mirror to provide a predetermined beam direction and a predetermined beam angle in two dimensions based on the tilt of the tiltable mirror, and wherein the optical beam is reflected off of the tiltable mirror three times to provide the predetermined beam direction and angle to the optical beam.

9. The optical architecture according to claim 8 wherein the first and second reflections of the beam off of the tiltable mirror cause the optical beam to be translated and the third reflection of the beam off of the tiltable mirror causes the optical beam to be directed at the predetermined beam angle.

10. The optical architecture according to claim 8 wherein the first, second and third reflections of the beam off of the tiltable mirror have the substantially same angle relative to normal when the tiltable mirror is not tilted.

11. The optical architecture according to claim 8 wherein the optical beam first impinges the tiltable mirror, then impinges the first stationary mirror, then impinges the second stationary mirror, then impinges the third stationary mirror, then impinges the fourth stationary mirror, then impinges the fifth stationary mirror, then impinges the tiltable mirror, then impinges the sixth stationary mirror, then impinges the seventh stationary mirror, then impinges the eighth stationary mirror, and then impinges the tiltable mirror.

12. The optical architecture according to claim 11 wherein the tiltable mirror, the first stationary mirror, the fifth stationary mirror, the sixth stationary mirror, the seventh stationary mirror and the eighth stationary mirror are in one plane, and the second stationary mirror, the third stationary mirror and the fourth stationary mirror are in a second plane perpendicular to the first plane.

13. The optical architecture according to claim 8 further comprising an aperture, wherein the tiltable mirror, the first stationary mirror, the second stationary mirror, the third stationary mirror, the fourth stationary mirror, the fifth stationary mirror, the sixth stationary mirror, the seventh stationary mirror and the eighth stationary mirror direct the optical beam through the aperture regardless of the tilt of the tiltable mirror.

14. The optical architecture according to claim 8 where the optical beam is a high-energy laser beam.

15. An architecture for directing a beam, said architecture comprising:
- an aperture;
- a single tiltable mirror; and
- a plurality of flat stationary mirrors, wherein the beam is reflected off of the tiltable mirror and the plurality of mirrors to provide a predetermined beam direction and a predetermined beam angle through the aperture based on the tilt of the tiltable mirror, and wherein the beam is reflected off of the tiltable mirror a plurality of times so as to provide the predetermined beam direction and angle.

16. The architecture according to claim 15 wherein the architecture provides a beam angle in one dimension, and wherein the plurality of flat stationary mirrors is three flat stationary mirrors.

17. The architecture according to claim 15 wherein the architecture provides a predetermined beam angle in two dimensions, and wherein the plurality of stationary mirrors is eight stationary mirrors.

18. The architecture according to claim 15 wherein the beam is reflected off of the tiltable mirror three times.

19. The architecture according to claim 15 wherein the beam is an optical beam.

20. The architecture according to claim 19 wherein the optical beam is a high-energy laser beam.

* * * * *